June 19, 1923.  
J. GOOD  
COMBUSTION ENGINE OIL PURIFIER  
Filed Feb. 20, 1917
1,459,301
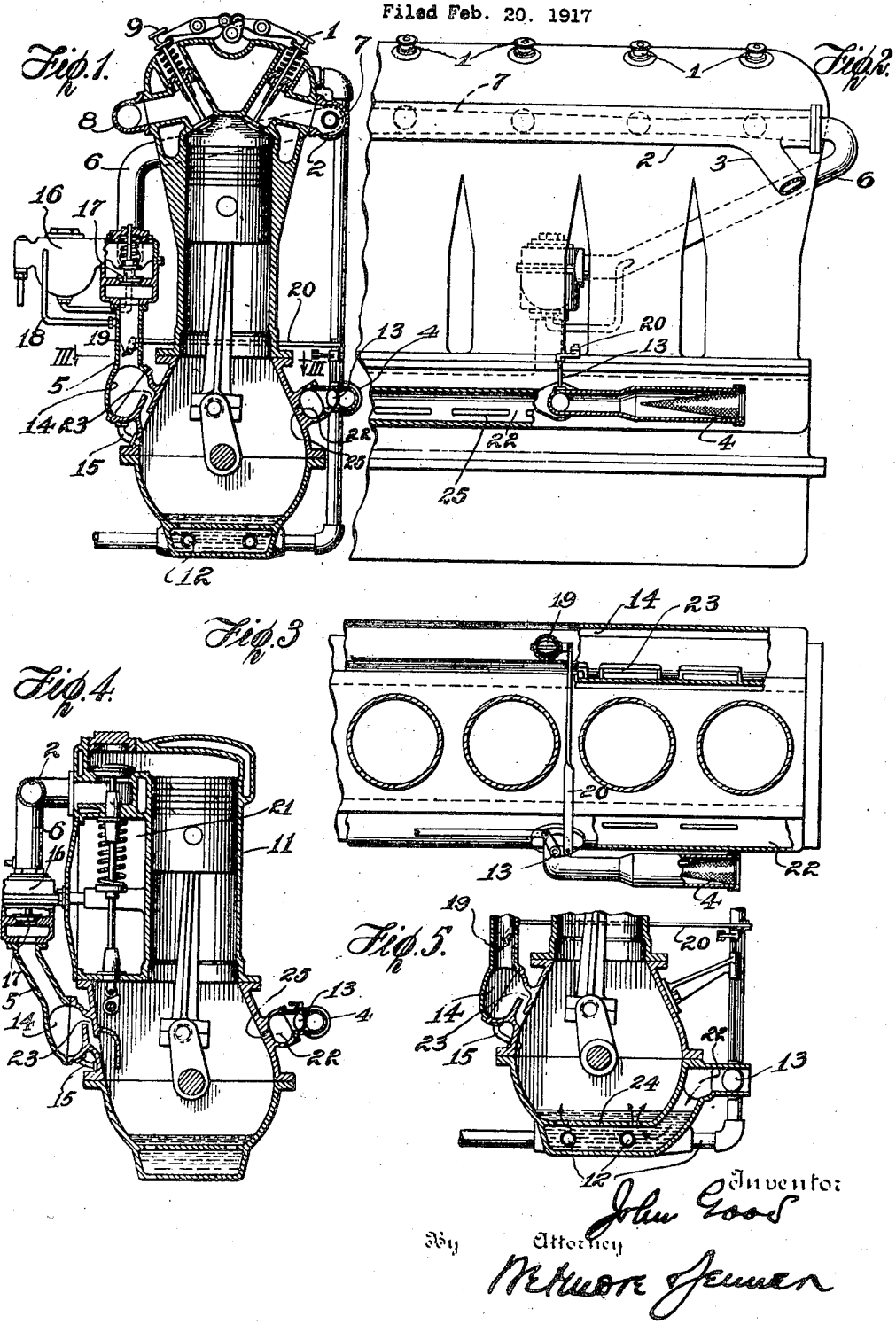

Patented June 19, 1923.

1,459,301

UNITED STATES PATENT OFFICE.

JOHN GOOD, OF BROOKLYN, NEW YORK, ASSIGNOR TO GOOD INVENTIONS CO., OF NEW YORK, N. Y., A CORPORATION OF NEW YORK.

COMBUSTION-ENGINE OIL PURIFIER.

Application filed February 20, 1917. Serial No. 149,839.

*To all whom it may concern:*

Be it known that I, JOHN GOOD, a United States citizen, residing in Brooklyn, New York, have invented the following described Improvements in Combustion-Engine Oil Purifiers.

The invention is directed to the elimination of the contamination of the lubricating oil in internal combustion engines using kerosene or low grade gasoline as fuel. In such engines the liquid fuel has a tendency to condense on the walls of the cylinders and to be blown back, on the compression or explosion strokes, past the piston rings where it drips or flows into the lubricating oil in the crank case and seriously impairs the lubricating qualities of such oil resulting in rapid wear of the parts intended to be lubricated by it. The invention consists essentially in a means constituting part of the engine power plant for removing the liquid fuel from the oil by evaporation, the said fuel being always more readily volatile than the lubricating oil, and the evaporating agent being moved by the action of the engine itself, so that the power plant as a whole is self-cleansing of the fuel contamination in its lubricating oil. The invention also and incidentally consists in the employment of a relative vacuum as a means of facilitating vaporization of the liquid fuel, such vacuum also being induced and maintained by the engine action and also in the employment of the heat of combustion to raise the temperature of the oil to facilitate vaporization of the fuel as well as in a number of other features, all important and all of which are hereinafter disclosed and pointed out in the appended claims. The invention also consists in means for preventing or reducing leakage of air through the valve stem guides of the inlet valve or valves of the engine, this object being attained by maintaining a suitable vacuum effect at the outer end of the guide as hereinafter also pointed out.

In the accompanying drawings:

Fig. 1 represents in vertical cross-section an internal combustion engine designed for using kerosene or other liquid fuel with my invention, in one of its forms, applied thereto;

Fig. 2 is a partial side elevation of said engine with parts broken off and in section;

Fig. 3 is a top plan of Fig. 2 partly in horizontal section on line III—III of Fig. 1;

Fig. 4 is a vertical cross-section, similar to Fig. 1, of a different type of engine; and Fig. 5 is a detail representing also the preferred form.

The general construction of the engine shown will be recognized without detailed description. The exhaust valves 1 discharge into an exhaust header 2 having a suitable off-take 3. The suction intake passage of the engine begins at the air strainer 4 through which air flows first, into the crank case, from thence into the passage 5 leading to the carburetor or charge proportioner, from the latter by pipe 6 to the Venturi tube 7 contained within the exhaust header 2, and from the left-hand end of the Venturi tube (not appearing in Fig. 2) the charge mixture is led to the intake manifold 8 and thence to the several inlet valves 9. An overhead valve gear of familiar design operates the valves 1 and 9 on a four-cycle stroke and the described relation of intake and exhaust passages adapts the engine for using kerosene or low grades of gasoline or other fuel. The heating by the exhaust of the Venturi tube part of the suction intake vaporizes the fuel in the charge mixture flowing through it and prepares such fuel for combustion in the engine cylinder, but the present invention is not concerned with means for preparing or vaporizing the fuel charge and any means for that purpose may be understood as comprehended by the invention. The illustrated engine also shows a special form of engine cylinder construction, water jacketed or cooled at the top and having relatively thick tapered walls 10 around the lower part of the combustion space. This structure, having thin walls toward the lower part of the cylinders, is specially adapted to kerosene engines as a means of preserving a higher wall temperature at the lower part of vertical engine cylinders and thereby preventing condensation of the liquid fuel which comes in contact with such wall and by so much reducing or minimizing the amount which may escape past the piston to contaminate the lubricating oil in the crank case. Very obviously this result can also be obtained in other ways, as for instance in the manner shown in Fig. 4, wherein the water jacket at the top of the engine cylinder is omitted at its lower part marked 11. These means for maintaining the cylinder walls and barrels relatively hot, and thereby restraining contamination of the lubricating oil in the crank case, form the subject of a separate application. They are not essential to the present invention but are desirably used with it to minimize the extent of the contamination requiring to be removed.

The engine crank case, which will be understood to be closed except for its connection with the suction intake passage of which it forms a part, constitutes a space for collecting or containing engine lubricating oil and is commonly arranged to be filled with oil to such extent that the latter will be struck by the crank and splashed violently all around the enclosure, this being a means of lubricating the pistons and their connecting rods. It is however, not essential that the oil be splashed by the crank although the agitation of course facilitates evaporation of its contained fuel liquid, nor is it essential that the oil-collecting space be constituted directly as a part of the crank case although such location of the collected body of oil is desirable for obvious reasons. The contained or collected oil in the crank case is heated because the contaminating fuel liquid is not readily volatile, and for this purpose the hot water from the water jacket, or some other suitable heated medium, is circulated through the pipes 12 which are submerged in the oil. The heat so applied not only facilitates the separation of the fuel from the oil but also reduces the viscosity of the oil thereby enabling it to flow freely to the oil pump (not shown) and thence to all the various engine bearings even in the coldest weather, this action being supplemental to the elimination of contamination but no less important.

In Figs. 1 and 4 the air inflowing to the closed space or crank case circulates over and in contact with the lubricating oil therein and by evaporation separates from it the liquid fuel which is carried by the air to the charge-forming device and eventually to the engine cylinder. In addition to the assistance to vaporization afforded by the agitation or splash and by the heat from the water jacket, the relative obstruction to flow represented by the air strainer 4 and the throttle valve 13, in the entrance to the crank case, establishes a relative vacuum in the latter which still further promotes vaporization of the contaminating liquid. Such relative vacuum is continuously maintained during the action of the engine as will be presently pointed out. The enlargement 14 in the suction intake passage is a trap to collect drops of lubricating oil carried out of the crank case with the air current and it is provided with a drain outlet 15 leading back to the crank case oil chamber.

The charge forming device may be of any ordinary type and as shown herein includes a float-controlled liquid fuel receptacle 16 and is operated by the suction effect of the engine to spray fuel from the liquid chamber into, and mix it with, the air current in proper proportions. The device also includes an air check 17 for establishing a difference of pressure as usual, to produce the spray, and the float chamber pressure is equalized by a small pipe 18 to the entrance side of the check 17. The throttle valve 19 between the crank case and the charge proportioning device serves the same purpose as the throttle valve 13 on the opposite side of the crank case and either one can be used in service control of the engine, but in order to eliminate any tendency to lag in the response to the throttle, as a result of the air storage space represented by the crank case chamber, both these valves are connected by a link 20 and are operated together. The throttle 13 establishes a dominating vacuum throughout the length of the suction intake, which, as above described, not only assists vaporization of the contaminating fuel liquid but may also serve additional and very important functions. For example, in the common type of four-cycle engine shown in Fig. 4, the vacuum effect, being communicated into the closed valve rod space 21, tends to prevent air leakage into the engine through the valve stem bearings particularly when the latter are worn and at the same time ill smelling vapors which might otherwise emanate from the crank case are not only confined thereto but are carried off and consumed—an effect which is dependent on the maintenance of a condition of continuous relative vacuum in the crank case.

Referring to the preferred form of this invention as illustrated in Fig. 5, it will be understood that the engine structure as a whole is the same as already described, but in this case the incoming air current, under the control of the throttle 13 as before, is led into the body of oil below its surface and bubbles up through the oil and through the apertures in the false bottom 24 of the crank case or oil space, thereby producing a greatly increased evaporative action. Heat may also be applied in this form of apparatus and the two throttles 13 and 19 may also be coordinated as before. It will of course be understood that where the evaporative effect of a current of air or other gaseous medium is relied upon for eliminating the fuel liquid, it is desirably distributed throughout the entire body of oil so as to have contact with it over the greatest amount of surface, and for this reason the air passing the throttle 13 enters first into a vestibule chamber 22 extending lengthwise of the crank case as shown in Fig. 3, and from this vestibule enters the crank case through a series of slotted openings 25. Similarly on the opposite side, the trap chamber 14 is coextensive with the length of the crank chamber and connected therewith through a series of slot openings 23. The same method of distribution is likewise used in Fig. 5.

Claims.

1. In an internal combustion engine, means for eliminating liquid fuel contamination from the lubricating oil thereof, comprising a collecting space for said oil, an entrance means into said space distributed along a wall thereof, and engine-operated means for maintaining a flow of gaseous medium through said distributed entrance in evaporative relation to the oil in said space and a condition of continuous relative vacuum therein during the engine operation.

2. Means for eliminating liquid fuel contamination from the lubricating oil in internal combustion engines comprising a closed space for collecting said oil and forming a part of the suction intake of the engine, a charge-forming device included in said intake and flow controlling members in said intake on opposite sides of said oil-collecting or containing space.

3. Means for eliminating liquid fuel contamination from lubricating oil in internal combustion engines, comprising a space for collecting or containing lubricating oil, means for heating the oil therein, and means for passing a gaseous medium through said space in evaporative contact with said heated oil.

4. Means for eliminating liquid fuel contamination from the lubricating oil in internal combustion engines comprising a space for collecting or containing said oil and means for passing gaseous medium through the body of oil in said space.

5. Means for eliminating liquid fuel contamination from the lubricating oil in internal combustion engines comprising a space for collecting or containing lubricating oil in combination with the suction intake of the engine arranged to conduct its gaseous medium through the body of oil therein.

6. Means for eliminating liquid fuel contamination from the lubricating oil in internal combustion engines comprising a space for collecting or containing lubricating oil, means whereby the combustion of the engine heats the oil therein and an engine intake passage arranged to conduct its gaseous medium into distributed, evaporative relation to said heated oil.

7. Means for eliminating liquid fuel contamination from lubricating oil in internal combustion engines, comprising a space for collecting or containing the oil, a gaseous medium inlet to said space, said inlet being distributed or elongated with respect to said space so as to distribute the gaseous medium throughout the entire body of oil, and engine-operated means for creating a flow of said medium through said inlet and space in fuel-evaporating relation to the oil therein.

8. Means for eliminating liquid fuel contamination from the lubricating oil in internal combustion engines, comprising a space for collecting or containing the oil and subjected to the heat of the engine and suitable passages for bubbling a gaseous medium through said heated oil.

9. Means for eliminating liquid fuel contamination from lubricating oil in internal combustion engines, comprising a space for collecting or containing the oil, a distributing entrance for gaseous medium below the level of the oil therein and means for passing a gaseous medium through said entrance and the body of oil.

10. Means for eliminating fuel contamination from the lubricating oil in internal combustion engines comprising a space for containing the oil, a distributing entrance for gaseous medium below the level of the oil therein, means for passing a gaseous medium through said entrance and into the body of oil and means for maintaining a condition of relative vacuum in said space.

11. The combination of an engine, a distributing entrance for a gaseous medium extending along one side of the crank case thereof, means for creating a flow of gaseous medium through the same into the crank case in evaporative relation to the lubricating oil therein and an exit for said medium containing an oil trap.

12. In an internal combustion engine, the combination with a suction-operated charge-forming device, of an engine intake passage including the crank case of the engine, said device being included in said passage between the crank case and the engine inlet valve, and throttle means conjointly controlling the entrance and exit to the crank case space.

13. The combination with an internal combustion engine including the space in the crank case for collecting lubricating oil, of means for heating the oil in said space, and a passage connecting said space to an intake port of the engine to conduct the evaporated fuel to the latter.

14. The combination in an internal combustion engine, of the intake valve or valves, a valve stem bearing or guide therefor, a closed space adjacent the outer end of said guide, a suction intake having a throttle for restricting the flow therethrough and means for communicating the vacuum effect controlled by said throttle to said space.

15. The combination in an internal combustion engine, of the suction intake passage having a throttle, an engine intake valve having a valve stem guide or bearing, and a closed crank case subject to the relative vacuum effect caused by the throttle and in communication with the outer end of said valve stem guide.

16. The combination in an internal combustion engine, of a suction intake passage including a suction-operated, charge-forming device and the engine crank case, said crank case providing the entrance for the supply of air for the engine and the restriction to flow through said entrance serving to establish a vacuum effect in said intake passage suitable for operating said charge-forming device, an engine inlet valve, and a valve guide therefor the outer end of which is subject to the relative vacuum effect established by said crank-case entrance.

In testimony whereof, I have signed this specification.

JOHN GOOD.